(12) United States Patent
Takai et al.

(10) Patent No.: US 8,562,865 B2
(45) Date of Patent: Oct. 22, 2013

(54) METHOD OF PRODUCING M-C-N-O BASED PHOSPHOR

(75) Inventors: Jun Takai, Kurashiki (JP); Hideharu Iwasaki, Kurashiki (JP); Ferry Iskandar, Higashihiroshima (JP); Kikuo Okuyama, Higashihiroshima (JP)

(73) Assignees: Hiroshima University, Higashihiroshima-shi (JP); Kuraray Co., Ltd., Kurashiki-shi (JP)

( * ) Notice: Subject to any disclaimer, the term of this patent is extended or adjusted under 35 U.S.C. 154(b) by 225 days.

(21) Appl. No.: 13/133,795

(22) PCT Filed: Dec. 7, 2009

(86) PCT No.: PCT/JP2009/070450
§ 371 (c)(1),
(2), (4) Date: Jun. 9, 2011

(87) PCT Pub. No.: WO2010/067767
PCT Pub. Date: Jun. 17, 2010

(65) Prior Publication Data
US 2011/0260108 A1 Oct. 27, 2011

(30) Foreign Application Priority Data

Dec. 9, 2008 (JP) .................................. 2008-313454
Oct. 20, 2009 (JP) .................................. 2009-241626

(51) Int. Cl.
*C09K 11/63* (2006.01)
*C09K 11/65* (2006.01)
*C01B 35/00* (2006.01)
*C01F 7/00* (2006.01)

(52) U.S. Cl.
USPC ............... 252/301.4 F; 252/301.4 R; 423/365

(58) Field of Classification Search
USPC ...................... 252/301.4 F, 301.4 R; 423/365
See application file for complete search history.

(56) References Cited

U.S. PATENT DOCUMENTS

| 2005/0029495 A1 | 2/2005 | Hubacek et al. |
| 2010/0001631 A1 | 1/2010 | Gotoh et al. |
| 2010/0109508 A1* | 5/2010 | Okuyama et al. ............. 313/486 |

FOREIGN PATENT DOCUMENTS

| JP | 2005-54046 | 3/2005 |
| JP | 2008-88257 | 4/2008 |
| JP | 2008-208238 | 9/2008 |
| WO | WO 2008/126500 A1 | 10/2008 |

OTHER PUBLICATIONS

Extended European Search Report issued Aug. 16, 2012 in Patent Application No. 09831871.0.
Q. L. Liu, et al, "Green emission from $B_2N_2CO$ thin films doped with Tb", Applied Physics Letters, vol. 81, No. 1, XP012031783A, Jul. 1, 2002, pp. 34-36.

* cited by examiner

*Primary Examiner* — Carol M Koslow
(74) *Attorney, Agent, or Firm* — Oblon, Spivak, McClelland, Maier & Neustadt, L.L.P.

(57) ABSTRACT

A method of producing an M-C-N-O based phosphor with reduced non-uniform emission and improved color purity is provided. The method of producing an M-C-N-O based phosphor comprising a group IIIB element (M), carbon (C), nitrogen (N) and oxygen (O) comprises: heating a mixture comprising a group IIIB element-containing compound and a nitrogen-containing organic compound to form a pyrolysate; disintegrating the resulting pyrolysate-containing product; and firing the disintegrated product.

20 Claims, 7 Drawing Sheets

METHOD OF PRODUCING M-C-N-O BASED PHOSPHOR

TECHNICAL FIELD

The present invention relates to M-C-N-O based phosphors comprising a group IIIB element (M), carbon (C), nitrogen (N) and oxygen (O) useful as an electronic or fluorescent material, and methods of producing the same.

BACKGROUND ART

Phosphors are used in fluorescent tubes, fluorescent display tubes, luminous display boards, and the like, and application of phosphors has been increasing. In recent years, attempts are made to use a phosphor in combination with an LED in various display apparatuses including TV monitors. Furthermore, white phosphors, which are expected to be applicable to a wide variety of fields, have actively been studied and developed.

There are various organic and inorganic fluorescent materials for use as a raw material of a phosphor, including natural fluorescent materials. Using such fluorescent materials as a raw material, various research and development have been conducted in an attempt to provide desired emission colors of phosphors, improvement in peak intensity of emission spectra or, economic efficiency of phosphors and the like.

As a result of such research and development, new phosphors and methods of producing the same have been reported in recent years.

For example, Patent Document 1 discloses a phosphor represented by the general formula MmAaBbOoNn:Z (wherein M is one or more elements having a valency of II; A is one or more elements having a valency of III; B is one or more elements including at least Si and having a valency of IV; O is oxygen; N is nitrogen; Z is one or more activator agents; m>0; a>0; b>0; o≥0; and n>0.). Regarding a method of producing the above-described phosphor, Patent Document 1 describes that when the phosphor is obtained by firing a predetermined mixture in a firing furnace, it is desirable to perform the firing of the mixture at least twice and to grind and mix the fired mixture between the firing steps, and also that repetition of the firing step provides an improvement in uniformity of the fired product and emission efficiency of the phosphor.

Patent Document 2 discloses a monoclinic phosphor mainly composed of an inorganic compound in which metal element M (wherein M is one or two or more elements selected from Mn, Ce, Pr, Nd, Sm, Eu, Gd, Tb, Dy, Ho, Er, Tm and Yb) forms a solid solution with a host crystal represented by AxSiyN (2/3x+4/3y) (0<x<2, y=2-x) (wherein A is one or two or more elements selected from Mg, Ca, Sr and Ba). Regarding a production method of the monoclinic phosphor, Patent Document 2 describes that when aggregate powders obtained by firing adhere firmly to one another, it is desirable to grind the aggregate powders by use of a grinder to reduce their average particle size to 20 μm or smaller and thereafter to subject the powders to thermal treatment at a temperature of 1000° C. or higher, whereby the surface state of the fired product, which has been degraded during the grinding and the like, can be ameliorated to improve brightness of the phosphor.

Patent Document 3 discloses a method of producing a phosphor in which the phosphor precursor, which is prepared by thermal solidification of a mixed melt comprising combination of a metal compound containing at least one metal selected from the group consisting of Al, B, Ba, Be, Bi, Ca, Cd, Cs, Ga, Ge, Hf, In, K, Li, Mg, Mo, Nb, P, Rb, Si, Sn, Sr, Ta, Ti, V, W, Zr and rare earth metals with carbamide and/or carbamide derivative, is ground and then fired to produce the desired phosphor. Carbamide and the like are decomposed into a resin component during the process of preparing the precursor. This resin component facilitates grinding treatment of the precursor. Once the precursor is subjected to the subsequent firing step, the resin component disappears completely. Accordingly, components derived from carbamide and the like would not remain in the final phosphor product.

Patent Document 4 discloses an M-C-N-O based phosphor comprising a group IIIB element (M), carbon (C), nitrogen (N) and oxygen (O) and a method for producing the same, in which boron (B) is used as the group IIIB element and a solution of a mixture comprising boric acid, carbamide, and a polymer is fired.

CITATION LIST

Patent Documents

Patent Document 1: JP 2008-88257 A
Patent Document 2: JP 2008-208238 A
Patent Document 3: JP 2005-54046 A
Patent Document 4: WO 2008/126500

SUMMARY OF INVENTION

Technical Problem

The phosphors disclosed in Patent Documents 1 to 3 contain a rare earth element. Thus, a rare earth element containing substance is used as a raw material to produce these phosphors. However, there is a problem that in general a rare earth element containing substance is expensive. Further, in view of resource conservation, procurement of resources within Japan, and reduction of our reliance on foreign resources, which have been emphasized in recent years, there has been a demand for development of a phosphor free of rare earth element.

Meanwhile, in conventional phosphor production methods as disclosed in Patent Documents 1 to 3, it is required to use different raw materials for the production of respective phosphors having different emission colors. Furthermore, in order to obtain emission of various colors (including white and half-tone colors) from such a phosphor, it is required to use the phosphor in combination with an LED or phosphor produced from a different material system. Thus, different methods and apparatuses for preparing a crystal would be necessary for respective material systems. This requires tremendous amounts of costs, work, and time and also accumulation of techniques. Furthermore, in order to produce a light-emitting device using the above phosphors, it is necessary to adjust the particle size of each phosphor. However, when the phosphors are subjected to impact treatment, polishing treatment, disintegration treatment or the like, a change in fluorescent color or a decrease in fluorescence intensity occurs. Therefore, there is a problem of difficulty in obtaining a fine phosphor particle suitable for use as a raw material of a light-emitting device (especially phosphor with high color purity, uniform brightness, and high uniformity).

On the other hand, the phosphor disclosed in Patent Document 4 is desirable in view of economical efficiency and environmental protection, because it contains neither rare earth elements nor heavy metals. Further, since the wavelength of the peak top of the emission spectrum of the phosphor varies according to the amount of carbon contained therein, it is expected that the disclosed phosphor is useful for the development of a light-emitting device which has a simple structure but is capable of emitting light of various colors. Especially, it is expected that a white phosphor with excellent color rendering properties is developed by combining a blue phosphor, a green phosphor and a red phosphor, each of which has been separately produced before the combination of the different phosphors.

However, in order to produce a light-emitting device comprising a combination of M-C-N-O based phosphors having different fluorescent colors, it is desirable that the emission spectra of the respective phosphors have a narrower peak width than that of the phosphor shown in Patent Document 4. Furthermore, a phosphor with higher color purity, uniform brightness, and high uniformity is desired.

In response to the problems of conventional techniques and social demand as noted above, the object of the present invention is to provide a method of producing an M-C-N-O based phosphor with reduced non-uniform emission and improved color purity.

Solution to Problem

Since carbon is considered to play an important role in fluorescence emission of an M-C-N-O based phosphor, the present inventor focused on formation of a pyrolysate by thermal treatment of raw material compounds of an M-C-N-O based phosphor and the effect of dispersion of the pyrolysate, and made extensive and intensive studies to make the present invention. The method of the present invention provides:

[1] A method of producing an M-C-N-O based phosphor comprising a group IIIB element (M), carbon (C), nitrogen (N) and oxygen (O), comprising:

heating a mixture comprising a Group IIIB element-containing compound and a nitrogen-containing organic compound to form a pyrolysate;

disintegrating the resulting pyrolysate-containing product; and firing the disintegrated product in an oxygen-containing atmosphere;

[2] The method of [1], wherein the mixture further comprises a dispersing agent;

[3] The method of [1] or [2], wherein the mixture comprising a Group IIIB element-containing compound and a nitrogen-containing organic compound is heated at the temperature in the range of from 150° C. to 600° C.;

[4] The method of any one of [1] to [3], wherein the mixture comprising a Group IIIB element-containing compound and a nitrogen-containing organic compound is heated under an inert gas atmosphere;

[5] The method of any one of [1] to [4], wherein the firing temperature is in the range of from 500° C. to 1000° C.;

[6] The method of any one of [1] to [5], further comprising grinding the phosphor product obtained by the firing;

[7] The method of [6], wherein the phosphor product is ground into particles having an average particle size of 1 μm or smaller;

[8] The method of any one of [1] to [7], wherein the Group IIIB element (M) is boron (B);

[9] The method of any one of [1] to [7], wherein the Group IIIB element (M) is aluminum (Al);

[10] An M-C-N-O based phosphor produced by the method of [8], wherein a ratio of a peak intensity observed at 1300 to 1400 $cm^{-1}$ to a peak intensity observed at 1200 to 1250 $cm^{-1}$ in an IR spectrum of the M-C-N-O based phosphor is 0.5 or greater and 2 or lower; and

[11] An M-C-N-O based phosphor produced by the method of any one of [1] to [9], wherein the M-C-N-O based phosphor has an average particle size of 1 μm or smaller.

Advantageous Effect of Invention

The production method of the present invention provides an M-C-N-O based phosphor having a narrow emission spectrum width, and ensures stable procurement of a phosphor with high color purity, uniform brightness, and high uniformity.

DESCRIPTION OF EMBODIMENTS

A method of producing an M-C-N-O based phosphor according to the present invention comprises the steps of: heating a mixture comprising a group IIIB element-containing compound and a nitrogen-containing organic compound to form a pyrolysate, disintegrating the pyrolysate-containing product formed in the pyrolysate forming step, and firing the disintegrated product obtained from the disintegrating step. The step of heating a mixture comprising a group IIIB element-containing compound and a nitrogen-containing organic compound to form a pyrolysate is a step in which an organic product contained in a mixture of raw material compounds of the present M-C-N-O based phosphor is pyrolyzed under conditions that would not allow the organic compounds to disappear by combustion, so that carbon and nitrogen derived from the organic compound and other constituent elements contained in the raw material compounds are allowed to react to form a pyrolysate in the mixture. From the fact that the mixture of raw material compounds heated in this step was changed into a blackish solid, it can be inferred that a part of the raw material compounds was carbonized to cause pyrolysis reaction involving deoxidation and dehydrogenation. The product is obtained as a solid and contains the pyrolysate which forms fused portions in the solid product. The product is subjected to the disintegrating step so that the pyrolysate is uniformly dispersed in the product. The crushed and pulverized (i.e., disintegrated) product from the disintegrating step is then subjected to the firing step.

The disintegrating step included in the production method according to the present invention is performed so that the pyrolysate formed in the pyrolysate forming step is uniformly distributed in the raw materials of the M-C-N-O based phosphor to have uniform carbon composition throughout the M-C-N-O based phosphor obtained as a final product. Thus, the disintegrating step must be performed following the pyrolysate forming step. Hence, a disintegrating step employed in a method of producing a phosphor according to prior art, e.g., a disintegrating step which "preferably comprises grinding and mixing a product obtained after at least two firing steps whereby improvements are made in uniformity of the fired product and emission efficiency of the phosphor," is different from the disintegrating step of the present invention in that it does not involve any step of forming a pyrolysate. Further, the step of firing the product obtained as raw materials of M-C-N-O based phosphor from the pyrolysate forming step and the disintegrating step of the production method according to the present invention produces an intended M-C-N-O based phosphor. Therefore, the firing step of the present invention is essentially different from any disintegrating step which is performed to "ameliorate the state of a surface which has been deteriorated during the grinding or the like" or any thermal treatment performed following the disintegration step in a phosphor production method according to prior art.

In the method of producing an M-C-N-O based phosphor according to the present invention, the group IIIB oxide to be used as a raw material may be any compound comprising a group IIIB oxide as a building unit of a basic framework. Examples of the group IIIB oxide that can be used include: boric acid, boric acid anhydride, and esters, amides, and ammonium salt derivatives of any of the foregoing; aluminic acid, and esters, amides, and ammonium salts derivatives thereof; aluminum hydroxide; alumina; gallium hydroxide; gallium oxide; indium hydroxide; and indium oxide. In view of efficiencies in the production of the M-C-N-O based phosphor and availability and stability of raw materials, it is preferable to use boric acid, boric acid anhydride, an ammonium salt of any of the foregoing; aluminum hydroxide, gallium hydroxide, gallium oxide hydrate, or indium hydroxide. The above compounds to be used as a raw material may be prepared by hydrolyzing other equivalent hydrochlorides, sulfates, or the like with a basic solution. Among the above compounds, boric acid, boric acid anhydride, and aluminum hydroxide are especially preferred.

In the method of producing an M-C-N-O based phosphor according to the present invention, the nitrogen-containing organic compound used as a raw material is not particularly limited, and any compound that is thermally decomposable into ammonia may be used. Examples of the nitrogen-containing organic compound that can be used include: carbamide; carbamates such as methyl carbamate and ethyl carbamate; amides such as formamide and acetamide; lactams such as $\epsilon$-caprolactam, $\gamma$-butyrolactam, and N-methylpyrrolidone; and ammonium salts such as ammonium formate and ammonium acetate. In view of effects of incorporation of nitrogen into the M-C-N-O based phosphor, availability and the like, carbamide, amides, and ammonium salts are preferred; in view of economical efficiency and operability, carbamide is especially preferred.

In the present invention, a dispersing agent, which contains a carbon element, may be added to the mixture comprising a group IIIB element-containing compound and a nitrogen-containing organic compound, before the mixture is used. The dispersing agent not only serves as a carbon source for the M-C-N-O based phosphor but also facilitates reaction of the group IIIB element-containing compound with the nitrogen-containing organic compound. When any of the below-mentioned solvents is used, the dispersing agent also improves dispersibility of the boron-containing compound and the nitrogen-containing organic compound in the solvent and inhibits preferential precipitation of only one of those compounds upon evaporation of the solvent. The dispersing agent to be used is not particularly limited, and preferably includes a compound having high affinity especially to the group IIIB element-containing compound. Preferably, the dispersing agent has a boiling point that is higher than a temperature at which the nitrogen-containing organic compound is decomposed into ammonia.

Examples of the dispersing agent include: polyethers such as polyethylene glycol (PEG), polyethylene glycol dimethyl ether, and polyethylene oxide; polyamides such as polyvinyl pyrrolidone; polymeric compounds such as hydroxyl polymers such as polyvinyl glycerin and polyvinyl alcohol; polyhydric alcohols such as ethylene glycol, 1,2-propanediol, 1,3-propanediol, 1,2-butanediol, 1,4-butanediol, glycerin, diethylene glycol, triethylene glycol, and tetraethylene glycol; ethers such as dimethoxyethane, 1,2-propanediol dimethyl ether, 1,3-propanediol dimethyl ether, 1,2-butanediol dimethyl ether, 1,4-butanediol dimethyl ether, glycerin trimethyl ether, diethylene glycol dimethyl ether, triethylene glycol dimethyl ether, tetraethylene glycol dimethyl ether, diethoxyethane, 1,2-propanediol diethyl ether, 1,3-propanediol diethyl ether, 1,2-butanediol diethyl ether, 1,4-butanediol diethyl ether, glycerin triethyl ether, diethylene glycol diethyl ether, triethylene glycol diethyl ether, tetraethylene glycol diethyl ether, and tetraethylene glycol diethyl ether; and lactams such as N-methylpyrrolidone. In view of availability, effect of incorporation of carbon and the like, it is preferable to use a polymeric compound, such as polyethylene glycol, or a polyhyric alcohol, such as ethylene glycol and glycerin.

In the present invention, the mixture comprising a group IIIB element-containing compound, a nitrogen-containing organic compound and optionally a dispersing agent may be heated to form a pyrolysate. Alternatively, a solution or suspension obtained by dissolving or suspending the above mixtures in a solvent may be heated to form a pyrolysate. The solvent is not particularly limited, and any solvent may be used that can dissolve the group IIIB element-containing compound and the nitrogen-containing organic compound and can maintain dispersibility of these compounds. Specifically, water and alcohols, such as methanol and ethanol, can be used. In view of safety in use, explosiveness and the like, it is especially preferable to use water.

It is especially important that the solvent to be used contain no impurity. Especially contamination of the solvent with alkali metals or alkali earth metals is unfavorable, because there is concern that alkali metals or alkali earth metals react with the group IIIB element-containing compound to cause structural changes in the phosphor product, which may affect emission of light. Contamination of the solvent with heavy metals is also unfavorable, because there is concern that heavy metals may have an effect on structural formation of the M-C-N-O based phosphor. Contamination of the solvent with halogens or the like is unfavorable, because halogens expedite decomposition of the nitrogen-containing organic compound and inhibit incorporation of nitrogen into the M-C-N-O based phosphor. Accordingly, preferably the total amount of these impurities contained is 5000 ppm or smaller, more preferably 1000 ppm or smaller.

An amount of each of group IIIB element-containing compound and nitrogen-containing organic compound to be used cannot be specified unconditionally because they depend on the types of compounds to be used, a firing temperature, a period of firing time and the like, but in general 10 to 1500 parts by weight, preferably 50 to 1200 parts by weight, of nitrogen-containing organic compound is used with respect to 100 parts by weight of group IIIB element-containing compound.

An amount of a dispersing agent to be used is not particularly limited. Since the amount depends on the type of a compound to be used, a firing temperature, a period of firing time and the like, it cannot be specified unconditionally, but in general a dispersing agent is used in an amount of 1 to 200 parts by weight, preferably 5 to 190 parts by weight, with respect to 100 parts by weight of the group IIIB element-containing compound.

When a solvent is used in the production method of the present invention, the amount of a solvent to be used is not particularly limited. Since the amount depends on the type of a compound to be used, a firing temperature, a period of firing time and the like, it cannot be specified unconditionally, but in general a solvent is used in an amount of 1 to 50000 parts by weight, more preferably 1 to 10000 parts by weight, with respect to 100 parts by weight of group IIIB element-containing compound. Use of a solvent in an excessively large amount is economically inefficient, because this leads to an increases in time and heat quantity required to remove the solvent. Thus, it is more preferable to use the solvent within the range of 1 to 5000 parts by weight.

In the present invention, as described above, the mixture comprising a group IIIB element-containing compound, a nitrogen-containing organic compound and optionally a dispersing agent is prepared. Mixing methods that may be used in the present invention are not particularly limited. For solid-solid mixing, the mixing may be performed using a ball mill, turbo mill, jet mill or the like. Alternatively, the mixing may be performed using a mortar or the like.

Raw materials may be mixed in a solution. Specifically, the mixture comprising a group IIIB element-containing compound, a nitrogen-containing organic compound and optionally a dispersing agent may be dissolved or suspended in a solvent, and the resulting solution or suspension may be used as a raw material mixture in the pyrolysate forming step. Alternatively, the solvent may be removed from the above solution or suspension by a process such as spray drying prior to the mixing.

As described above, the method of producing an M-C-N-O based phosphor of the present invention comprises the steps of: heating the above mixture to form a pyrolysate, disintegrating the pyrolysate-containing product formed in the pyrolysate forming step, and firing the disintegrated product produced in the disintegrating step.

The pyrolysate forming step may be carried out by any of the methods which allows pyrolysis of the nitrogen-containing organic compound in the above mixture or in the above solution containing the mixture to proceed, and thus various heating and firing apparatuses or devices may be used. Heating and firing methods to be performed in the present invention may employ a heating-firing furnace with a movable bed, such as a rotary kiln and a conical kiln, a heating-firing furnace with a continuous fixed bed, such as a roller hearth furnace and a pusher furnace, a heating-firing furnace with a batch fixed bed, such as an atmosphere adjusting furnace, or a pyrolysis furnace for use in spraying or a spray method. In place of the above firing apparatuses, a heater-kneader, e.g., an extruder such as a single screw extruder and a twin screw extruder, or a heater-mixer such as a torus disc may also be used.

In the pyrolysate forming step, the heating temperature depends on the amounts of group IIIB element-containing compound, nitrogen-containing organic compound, dispersing agent and the like and, thus, cannot be specified unconditionally, but in general the heating temperature is set within the range of 150° C. to 600° C. An excessively low heating temperature is unfavorable, because the nitrogen-containing organic compound would not be decomposed. An excessively high heating temperature is also unfavorable, because it would lead to an increase in energy consumption. Thus, the heating is conducted preferably within the range of 200° C. to 550° C., more preferably within the range of 200° C. to 500° C.

In the pyrolysate forming step, a rate of increasing the temperature is not particularly limited. However, when the rate of increasing temperature is excessively fast, it is required to use a special firing furnace which imposes unfavorable burden on facilities. Furthermore, decomposition of nitrogen-containing organic compound would proceed immediately, which is likely to cause problems of incomplete reaction proceeding with the group IIIB element-containing compound and, furthermore, incomplete proceeding of carbonization by decomposition and condensation of the nitrogen-containing organic compound which is likely to result in combustion and disappearance of the nitrogen-containing organic compound and thus failure to incorporate carbon. Hence, in general, the temperature is increased by 1° C. to 80° C. per minute, more preferably 2° C. to 50° C. per minute.

A period of time when the heating temperature is maintained cannot be specified unconditionally, because it depends on the amounts of a nitrogen-containing organic compound and a dispersing agent used, but in general the period is determined within the range of 0 to 180 minutes. An excessively short period is unfavorable, because it may result in insufficient heat transfer, which is likely to arise a problem concerning homogeneity. An excessively long period is also unfavorable, because it may result in carbon vacancies. Thus, it is preferable to conduct within the range of 1 to 150 minutes, more preferably 5 to 120 minutes.

As to an atmosphere in which the pyrolysate forming step is performed, either of an atmosphere of an inert gas such as nitrogen and rare gas (e.g., argon) (free of oxygen gas) or an atmospheric atmosphere (containing oxygen gas) can be used. However, since the nitrogen-containing organic compound is thermally decomposed during the pyrolysate forming step, it is preferable to shield the atmosphere from oxygen gas or to eliminate oxygen gas from the atmosphere, in view of risks of explosions due to the generation of ammonia. Thus, it is preferable to perform the pyrolysate forming step in an atmosphere of an inert gas, such as nitrogen gas, rare gas or the like. The foregoing procedures can be performed in a gas stream or in a closed atmosphere.

A rate of decreasing the temperature is not particularly limited. However, when the rate of decreasing the temperature is excessively fast, it is required to use a special firing furnace which imposes unfavorable burden on facilities. Thus, in general the temperature is decreased by 1° C. to 120° C. per minute, and more preferably by 2° C. to 100° C. per minute.

An atmosphere in which the temperature is decreased is not particularly limited; the temperature may be decreased in an atmosphere of an inert gas, such as nitrogen gas and argon gas, or alternatively in the presence of oxygen gas. In view of safety and the like, it is preferable to decrease the temperature in an atmosphere of an inert gas. Furthermore, at 300° C. or lower, moisture adheres to a target phosphor surface; thus, the gas present in the atmosphere at the time of decreasing the temperature is preferably dry gas.

The pyrolysate-containing product thus obtained is disintegrated and mixed to avoid aggregation and prevent non-uniform distribution of respective components. This procedure inhibits a decrease in color purity of the phosphor caused by incorporation of excessive carbon or by lack of introduced carbon. A dispersing agent may be added again at the time of the disintegrating and mixing. Disintegrating and mixing methods are not particularly limited. For solid-solid disintegration and mixing, the disintegration and mixing may be performed using a ball mill, a turbo mill, a jet mill or the like. Alternatively, the mixing may be performed using a mortar or the like. A degree of disintegration is not particularly limited. However, excessive disintegration is unfavorable, because it may cause disruption of gas flow during the firing and consequently may lead to uneven firing and formation of spots. Hence, the pyrolysate-containing product is disintegrated into particles having an average particle size within the range of, in general, 0.1 μm to 2 mm, more preferably 0.2 μm to 1 mm.

The disintegrated product is fired to obtain an M-C-N-O based phosphor. As in the pyrolysate forming step, the firing in the firing step may be performed using various heaters.

A firing temperature in the firing step cannot be specified unconditionally, because it depends on an amount of each of a group IIIB element-containing compound, a nitrogen-containing organic compound, and a dispersing agent used, and the like, but in general the firing temperature is set within the range of 500° C. to 1000° C. An excessively low firing temperature is unfavorable, because unreacted carbonization residues would adhere to the surface of a phosphor which leads to a decrease in emission efficiency. An excessively high firing temperature is also unfavorable, because it results in complete combustion of carbon components which generates carbon vacancies to cause a change in emission color. Thus, the firing step is performed preferably within the range of 510° C. to 950° C., more preferably 520° C. to 900° C.

A rate of increasing the temperature for this firing step is not particularly limited. However, when the rate of increasing the temperature is excessively fast, it is required to use a special firing furnace which imposes unfavorable burden on facilities. Thus, in general the temperature is increased by 1° C. to 80° C. per minute, more preferably 2° C. to 50° C. per minute.

A period of time when the firing temperature is maintained cannot be specified unconditionally, because it depends on the amounts of nitrogen-containing organic compound, and dispersing agent used, but in general the period is set within the range of 0 to 180 minutes. An excessively short period is unfavorable, because it may result in insufficient heat transfer, which is likely to arise a problem concerning homogeneity. An excessively long period is also unfavorable, because it may result in carbon vacancies. Thus, it is preferable to conduct within the range of 1 to 150 minutes, more preferably 5 to 120 minutes.

As to the firing atmosphere, the firing may be performed in the presence of oxygen so that excess carbon components are combusted. In general, the oxygen concentration is not particularly limited, but oxygen is used within the range of 1% to 30%, more preferably 3% to 25%. Further, while the temperature is maintained at an intended temperature, the atmosphere may be switched to an inert atmosphere to inhibit the fired product from changing into boric acid or alumina due to generation of carbon vacancies or oxidation of nitride. The foregoing procedures may be performed in a gas stream or in a closed atmosphere.

A rate of decreasing the temperature is not particularly limited. However, when the rate of decreasing the temperature is excessively fast, it is required to use a special firing furnace which imposes unfavorable burden on facilities. Thus, in general the temperature is decreased by 1° C. to 80° C. per minute, more preferably 2° C. to 50° C. per minute.

An atmosphere in which the temperature is decreased is not particularly limited, and the temperature may be decreased either in an atmosphere of an inert gas (e.g., nitrogen gas and argon gas) or in the presence of oxygen gas. In view of safety and the like, it is preferable to decrease the temperature in an inert atmosphere. Further, at 300° C. or below, moisture adheres to a target phosphor surface; thus, it is preferable to decrease the temperature in dry gas.

In the present invention, the resulting phosphor may be ground into fine particles. Grinding methods are not particularly limited. A mortar or the like may be used to grind the phosphor. Alternatively, a ball mill, a turbo mill, a jet mill or the like may also be used. These methods may be carried out in a dry condition or a wet condition involving a solvent such as an alcohol. By using the above-described grinding apparatuses or devices, the phosphor of the present invention can be formed into fine particles having an average particle size of 0.001 to 1 μm, more preferably 0.01 to 0.9 μm. Accordingly, the present invention can provide a phosphor which is suitable especially for uses that require the phosphor to be processed into fine particles prior to use. As used herein, the term "average particle size" refers to an accumulated volume average median diameter ($D_{50}$) which is determined based on a particle size distribution on a volumetric basis, as measured by a commercially-available laser diffraction/scattering particle size distribution analyzer.

EXAMPLES

The present invention is described in detail by the following Examples. However, it should not be understood that the technical scope of the present invention is limited by the Examples.

Example 1

In a mortar, 2.44 g (0.035 mol) of boric acid anhydride ($B_2O_3$, commercially available from Kishida Chemical Co., Ltd.), 10.5 g (0.175 mol) of carbamide [$(NH_2)_2CO$] (commercially available from Wako Pure Chemical Industries, Ltd.), and 1.2 g of PEG (molecular weight: 20000) were ground and mixed. The mixture was transferred into an alumina crucible, which was then placed in a heating furnace. The temperature within the furnace was raised at the rate of 10° C./min. in a nitrogen gas stream until the temperature reached 400° C. Then, the mixture contained in the crucible was subjected to heating treatment at 400° C. for 10 minutes. The resulting powder was disintegrated and mixed in a mortar and again transferred into the crucible, which was placed in the heating furnace. The temperature within the furnace was raised at the rate of 10° C./min in an atmospheric atmosphere until the temperature reached 800° C. Then, the mixture contained in the crucible was fired at 800° C. for 10 minutes.

Figure 1:
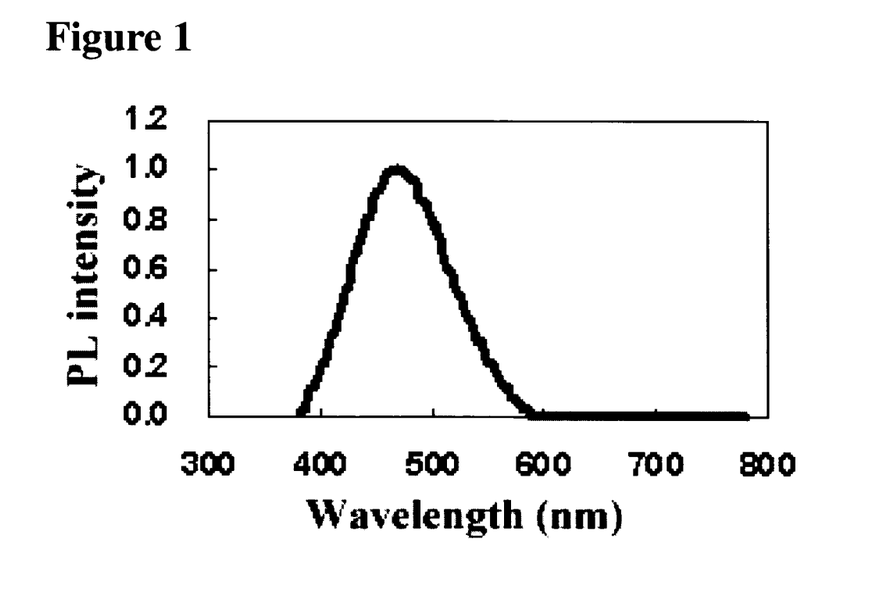
FIG. 1 is the ultraviolet excitation-emission spectrum of the phosphor obtained in Example 1.
Figure 8:
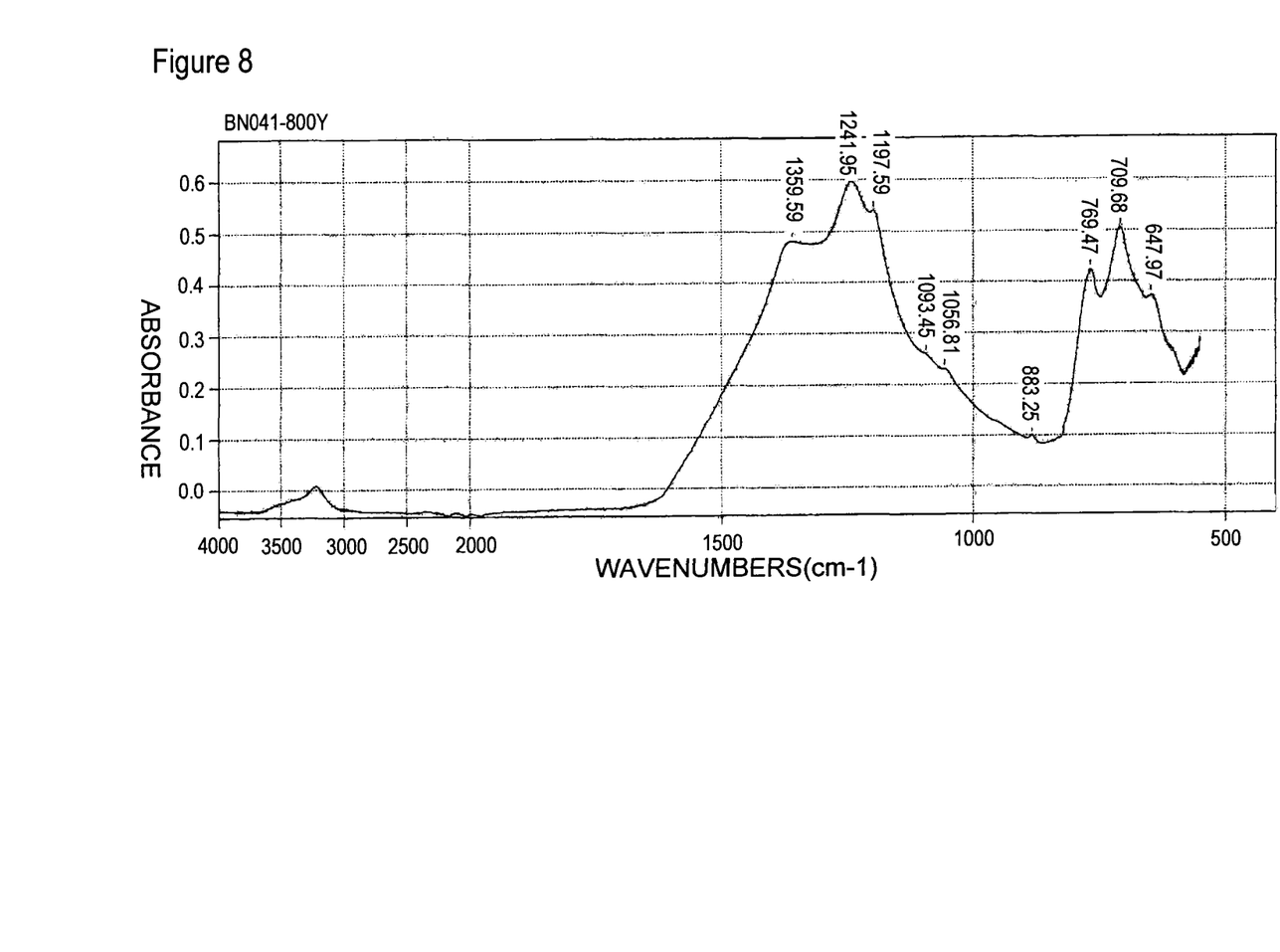
FIG. 8 is the infrared absorption spectrum of the phosphor obtained in Example 1.

The ultraviolet (350 nm) excitation-emission spectrum of the phosphor obtained in Example 1 is shown in FIG. 1. The measurement was conducted using FP-6500 (manufactured by JASCO Corporation). In FIG. 1, the horizontal axis indicates wavelength and the vertical axis indicates PL intensity. This explanation of the axes is also the case with the figures mentioned below. The fluorescence quantum efficiency was 56%. The infrared absorption spectrum of the phosphor were measured using a Fourier transform infrared spectrophotometer (manufactured by JEOL, JIR-5500) in the observation range of 250 to 4000 nm; the number of scanning was 30. The peak intensity of the absorption spectrum having a peak top at a wavenumber of 1360 cm$^{-1}$ was 5.5. The peak intensity of the absorption spectrum having a peak top at 1242 cm$^{-1}$ was 7.8. The ratio of the peak intensity of the absorption spectrum observed in the range of 1200 to 1250 cm$^{-1}$ to the peak intensity of the absorption spectrum observed in the range of 1300 to 1400 cm$^{-1}$ was 0.705 (see FIG. 8). The average particle size of the resulting phosphor particle was measured with a laser diffraction/scattering particle size distribution analyzer LA-950 (manufactured by Horiba Ltd.); the average particle size was 3 μm.

Comparative Example 1

Figure 2:
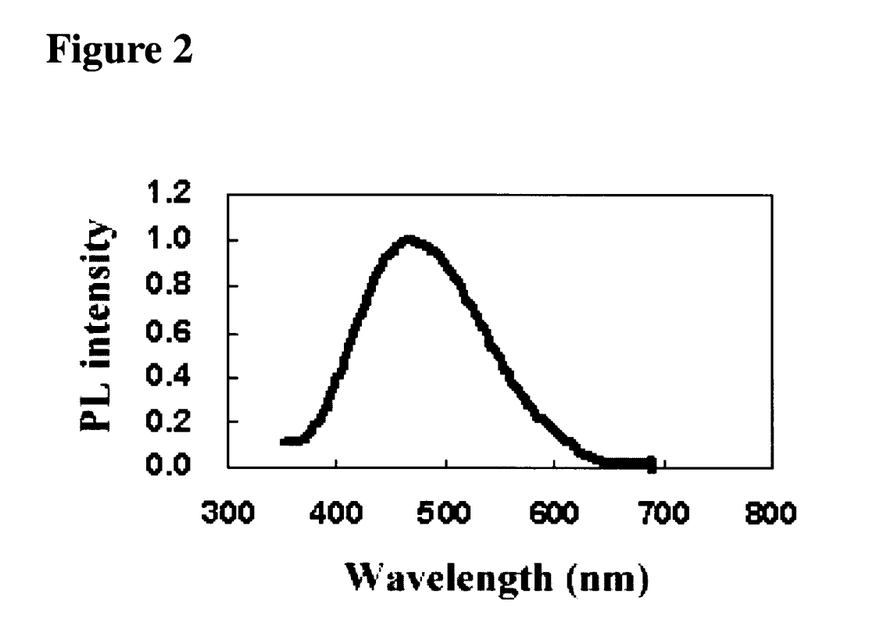
FIG. 2 is the ultraviolet excitation-emission spectrum of the phosphor obtained in Comparative Example 1.

In a mortar, 2.44 g (0.035 mol) of boric acid anhydride (B$_2$O$_3$, commercially available from Kishida Chemical Co., Ltd.), 10.5 g (0.175 mol) of carbamide [(NH$_2$)$_2$CO] (commercially available from Wako Pure Chemical Industries, Ltd.), and 1.2 g of PEG (molecular weight: 20000) were ground and mixed. The mixture was transferred into an alumina crucible, which was then placed in a heating furnace. The temperature within the furnace was raised at the rate of 10° C./min. in an atmospheric atmosphere until the temperature reached 800° C. Then, the mixture contained in the crucible was fired at 800° C. for 10 minutes. The ultraviolet excitation-emission spectrum of the resulting phosphor is shown in FIG. 2. The fluorescence quantum efficiency was 51%.

Figure 9:
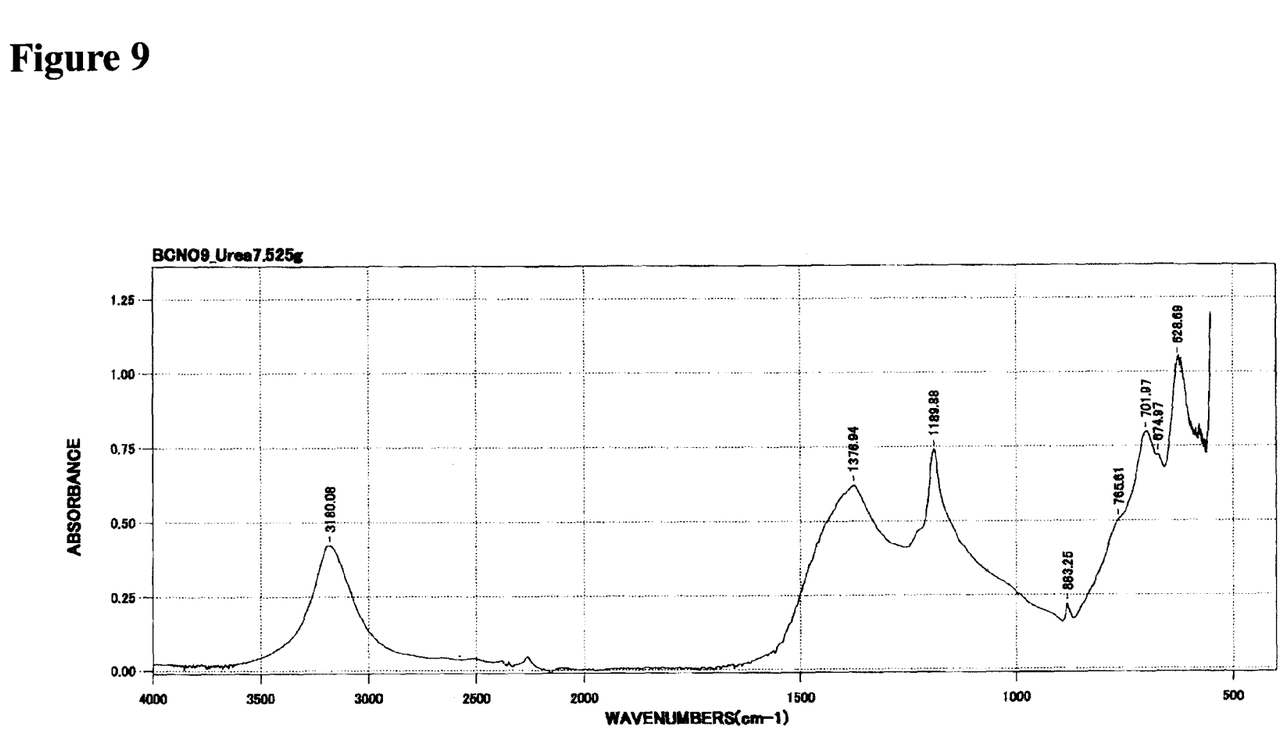
FIG. 9 is the infrared absorption spectrum of the phosphor obtained in Comparative Example 1.

The infrared absorption spectrum of the phosphor was measured using a Fourier transform infrared spectrophotometer (manufactured by JEOL, JIR-5500) in the observation range of 250 to 4000 nm; the number of scanning was 30. A plurality of absorption peaks appeared in the range of 1200 to 1250 cm$^{-1}$. Also a plurality of absorption peaks appeared in the range of 1300 to 1400 cm$^{-1}$. Thus, the intensity ratio could not be calculated (see FIG. 9).

Example 2

Figure 3:
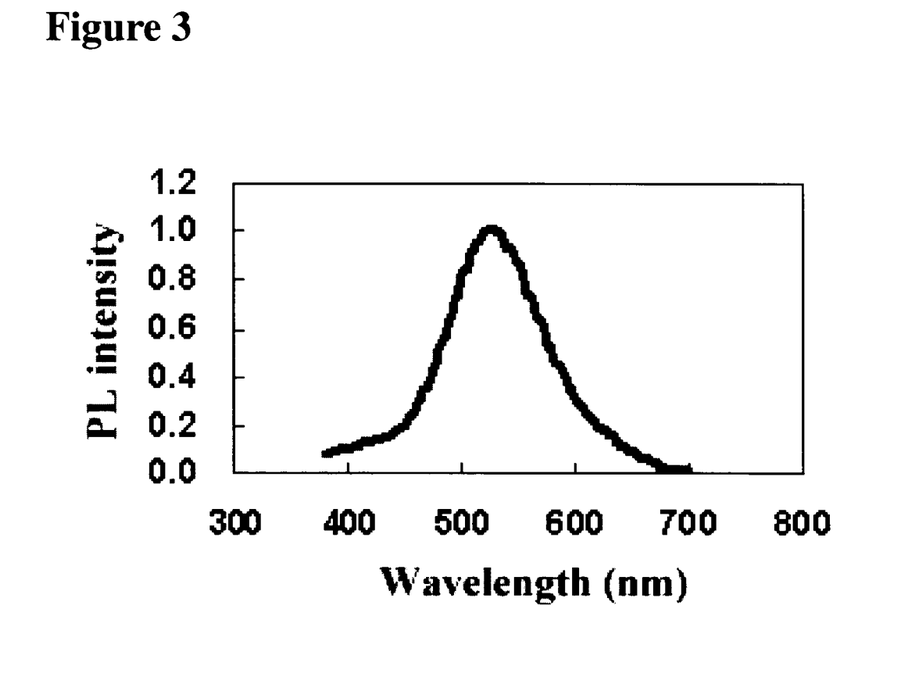
FIG. 3 is the ultraviolet excitation-emission spectrum of the phosphor obtained in Example 2.

In a 3000-ml beaker, 1.53 g (0.025 mol) of boric acid (H$_3$BO$_3$, commercially available from Wako Pure Chemical Industries, Ltd.), 15.3 g (0.25 mol) of carbamide [(NH$_2$)$_2$CO], and 1.0 g of PEG (molecular weight: 20000) were placed, and then 33.3 g of ultrapure water was added and stirred with a hot stirrer (revolution per minute: 500 rpm) until the above-mentioned compounds dissolved in the ultrapure water. The resulting solution was transferred into an alumina crucible, which was then placed in a heating furnace. The temperature within the furnace was raised at the rate of 10° C./min. in a nitrogen gas stream until the temperature reached 400° C., and then the mixture contained in the crucible was subjected to heating treatment at 400° C. for 10 minutes. The resulting powder was disintegrated and mixed in a mortar and again transferred into a crucible, which was then placed in a heating furnace. The temperature within the furnace was raised at the rate of 20° C./min. in an atmospheric atmosphere until the temperature reached 800° C. Then, the mixture contained in the crucible was fired at 800° C. for 30 minutes. The ultraviolet excitation-emission spectrum of the resulting phosphor is shown in FIG. 3. The fluorescence quantum efficiency was 44%.

The results of the measurement of the infrared absorption spectrum of the phosphor were as follows. The peak intensity of the absorption spectrum having a peak top at a wavenumber of 1360 cm$^{-1}$ was 6.5. The peak intensity of the absorption spectrum having a peak top at 1241 cm$^{-1}$ was 7.8. The ratio of the peak intensity of the absorption spectrum observed in the range of 1200 to 1250 cm$^{-1}$ to the peak intensity of the absorption spectrum observed in the range of 1300 to 1400 cm$^{-1}$ was 0.833.

The average particle size of the resulting phosphor particle was measured with a laser diffraction/scattering particle size distribution analyzer LA-950 (manufactured by Horiba Ltd.); the average particle size was 2.5 μm.

Comparative Example 2

Figure 4:
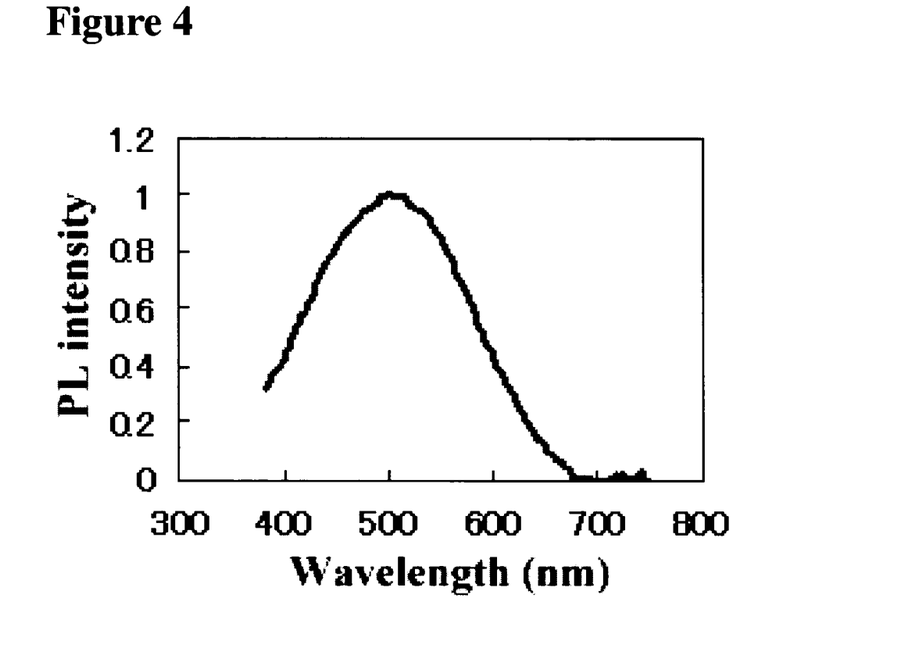
FIG. 4 is the ultraviolet excitation-emission spectrum of the phosphor obtained in Comparative Example 2.

In a 3000-ml beaker, 1.53 g (0.025 mol) of boric acid (H$_3$BO$_3$, commercially available from Wako Pure Chemical Industries, Ltd.), 15.3 g (0.25 mol) of carbamide [(NH$_2$)$_2$CO], and 1.0 g of PEG (molecular weight: 20000) were placed, and 33.3 g of ultrapure water was added and stirred with a hot stirrer (revolution per minute: 500 rpm) until the above-mentioned compounds dissolved in the ultrapure water. The resulting solution was transferred into an alumina crucible and placed in a heating furnace. The temperature within the furnace was raised at the rate of 20° C./min. in an atmospheric atmosphere until the temperature reached 800° C. Then, the mixture contained in the crucible was fired at 800° C. for 30 minutes. The ultraviolet excitation-emission spectrum of the resulting phosphor is shown in FIG. 4. The fluorescence quantum efficiency was 39%.

Figure 10:
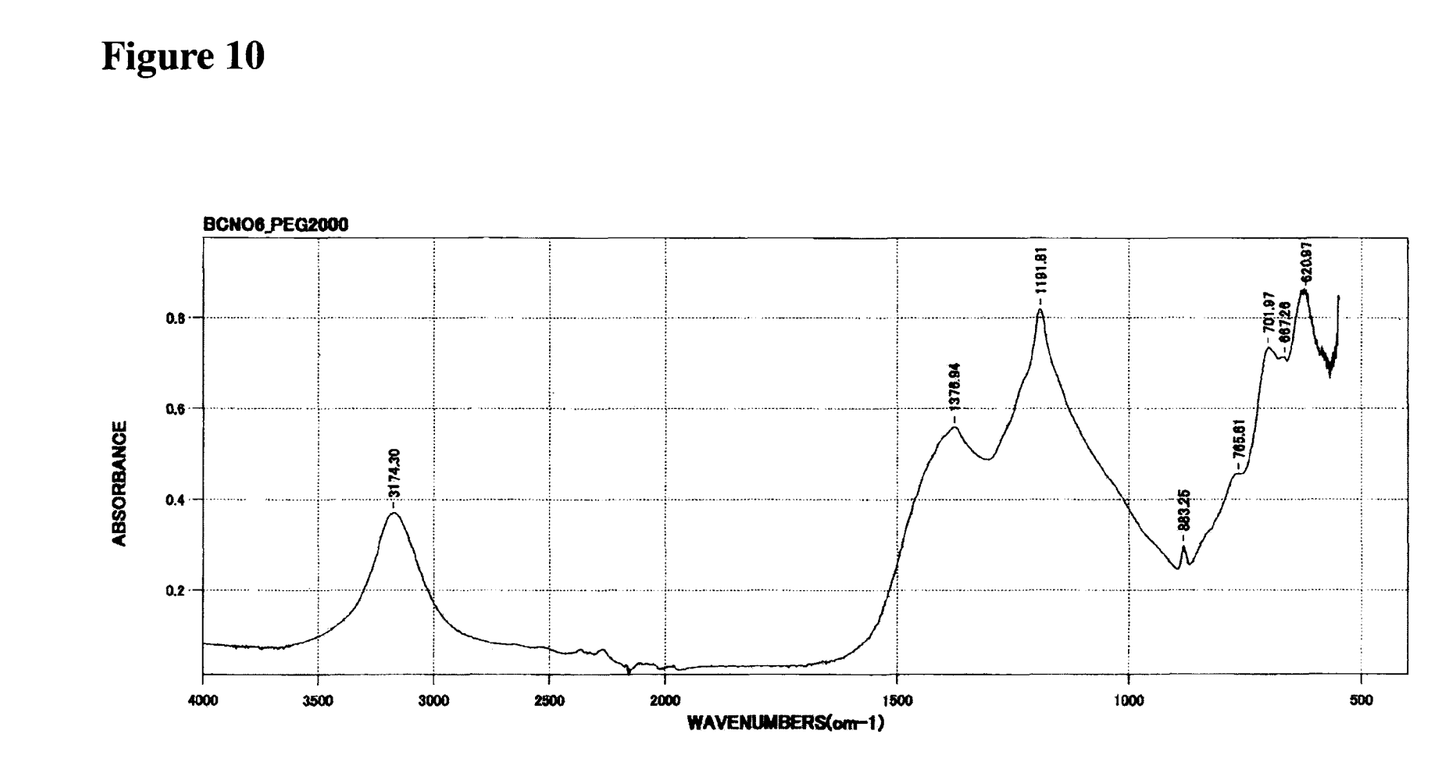
FIG. 10 is the infrared absorption spectrum of the phosphor obtained in Comparative Example 2.

The infrared absorption spectrum of the phosphor was measured using a Fourier transform infrared spectrophotometer (JIR-5500 manufactured by JEOL) in the observation range of 250 to 4000 nm; the number of scanning was 30. A plurality of absorption peaks appeared in the range of 1200 to 1250 cm$^{-1}$. Also a plurality of absorption peaks appeared in the range of 1300 to 1400 cm$^{-1}$. Thus, the intensity ratio could not be calculated (see FIG. 10).

Example 3

Figure 5:
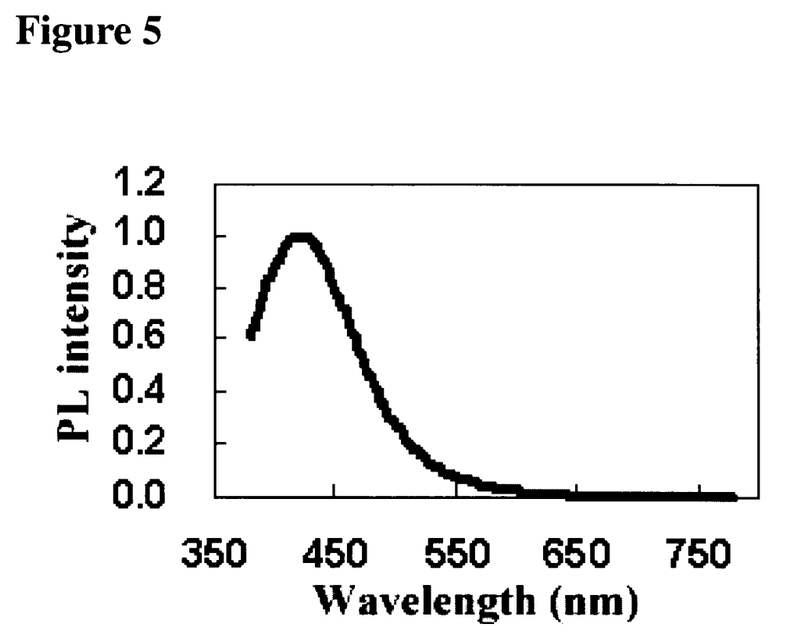
FIG. 5 is the ultraviolet excitation-emission spectrum of the phosphor obtained in Example 3.

In a mortar, 2.44 g (0.035 mol) of boric acid anhydride (B$_2$O$_3$, commercially available from Kishida Chemical Co., Ltd.), 10.5 g (0.175 mol) of carbamide [(NH$_2$)$_2$CO] (commercially available from Wako Pure Chemical Industries, Ltd.), and 1.2 g of PEG (molecular weight: 20000) were ground and mixed. The mixture was transferred into an alumina crucible, which was then placed in a heating furnace. The temperature within the furnace was raised at the rate of 10° C./min. in a nitrogen gas stream until the temperature reached 400° C. Then, the mixture contained in the crucible was subjected to heating treatment at 400° C. for 10 minutes. The resulting powder was ground and mixed in a mortar and again transferred into a crucible, which was then placed in a heating furnace. The temperature within the furnace was raised at the rate of 10° C./min. in an atmospheric atmosphere. Then, the mixture contained in the crucible was fired at 800° C. for 90 minutes. The ultraviolet (350 nm) excitation-emission spectrum of the resulting phosphor is shown in FIG. 5. The fluorescence quantum efficiency was 55%.

The results of the measurement of the infrared absorption spectrum of the phosphor were as follows. The peak intensity of the absorption spectrum having a peak top at a wavenumber of 1363 cm$^{-1}$ was 7.6. The peak intensity of the absorption spectrum having a peak top at 1220 cm$^{-1}$ was 4.3. The ratio of the peak intensity of the absorption spectrum observed in the range of 1200 to 1250 cm$^{-1}$ to the peak intensity of the absorption spectrum observed in the range of 1300 to 1400 cm$^{-1}$ was 1.813.

Example 4

Figure 6:
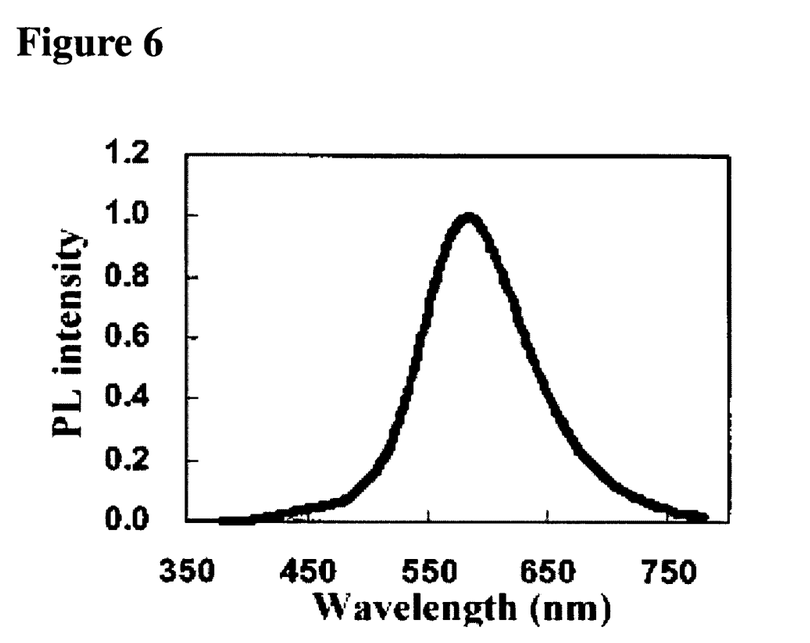
FIG. 6 is the ultraviolet excitation-emission spectrum of the phosphor obtained in Example 4.

In a mortar, 2.44 g (0.035 mol) of boric acid anhydride (B$_2$O$_3$, commercially available from Kishida Chemical Co., Ltd.), 10.5 g (0.175 mol) of carbamide [(NH$_2$)$_2$CO] (commercially available from Wako Pure Chemical Industries, Ltd.), and 2.6 g of PEG (molecular weight: 20000) were ground and mixed. The mixture was transferred into an alumina crucible, which was then placed in a heating furnace. The temperature within the furnace was raised at the rate of 10° C./min. in a nitrogen gas stream until the temperature reached 400° C. Then, the mixture contained in the crucible was fired at 400° C. for 10 minutes. The resulting powder was disintegrated and mixed in a mortar and transferred into a crucible, which was then placed in a heating furnace. The temperature within the furnace was raised at the rate of 10° C./min. in an atmospheric atmosphere until the temperature reached 800° C. Then, the mixture contained in the crucible was fired at 800° C. for 20 minutes. The ultraviolet (350 nm) excitation-emission spectrum of the resulting phosphor is shown in FIG. 6. The fluorescence quantum efficiency was 53%.

The results of the measurement of the infrared absorption spectrum of the phosphor were as follows. The peak intensity of the absorption spectrum having a peak top at a wavenumber of 1371 cm$^{-1}$ was 4.8. The peak intensity of the absorption spectrum having a peak top at 1220 cm$^{-1}$ was 6.4. The ratio of the peak intensity of the absorption spectrum observed in the range of 1200 to 1250 cm$^{-1}$ to the peak intensity of the absorption spectrum observed in the range of 1300 to 1400 cm$^{-1}$ was 0.75.

Example 5

The phosphor particle having an average particle size of 3 μm, obtained in Example 1, was charged in a 100-ml vessel of a ball mill and then subjected to 30-minute grinding five times. Using an LA-950 manufactured by Horiba Ltd., it was determined that the phosphor particle thus ground had an average particle size of 0.8 μm. Further, the ultraviolet (350 nm) excitation-emission spectrum was measured; the resulting emission spectrum had a shape similar to that of Example 1. As to the fluorescence quantum yield, almost no change was observed; the fluorescence quantum yield of the phosphor of Example 1 was 56% and that of Example 5 was 55%.

Example 6

The phosphor particle having an average particle size of 2.5 μm obtained in Example 2 was charged in a 100-ml vessel of a ball mill and then subjected to 30-minute grinding five times. Using an LA-950 manufactured by Horiba Ltd., it was determined that the phosphor particle thus ground had an average particle size of 0.6 μm. Further, the ultraviolet (350 nm) excitation-emission spectrum was measured; it was determined that the emission spectrum thus obtained had a shape similar to that of Example 2. As to the fluorescence quantum yield, almost no change was observed; the fluorescence quantum yield of the phosphor of Example 2 was 44% and that of Example 6 was 45%.

Example 7

Figure 7:
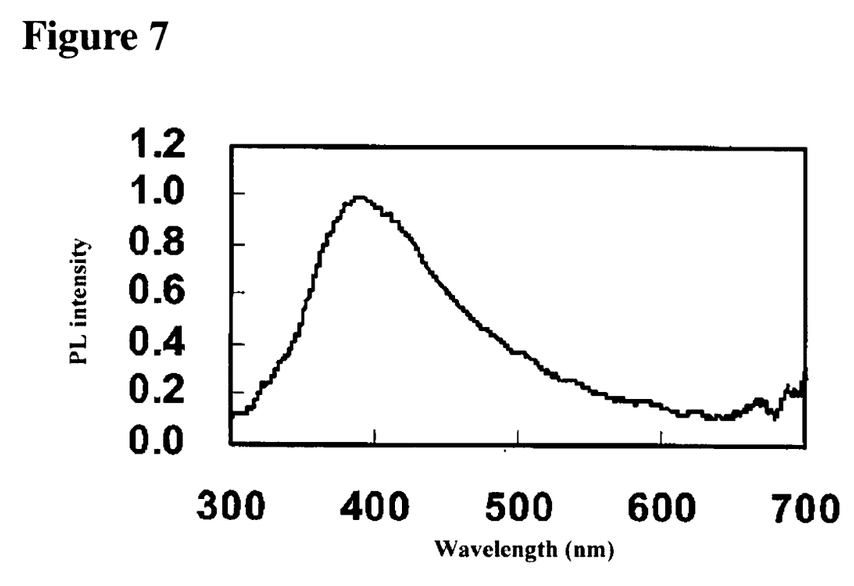
FIG. 7 is the ultraviolet excitation-emission spectrum of the phosphor obtained in Example 7.

To 7.92 g (0.024 mol) of aluminum nitrate hexahydrate (commercially available from Wako Pure Chemical Industries, Ltd.) and 15.0 g (0.25 mol) of carbamide [(NH$_2$)$_2$CO] (commercially available from Wako Pure Chemical Industries, Ltd.) were placed in a 300-ml beaker, and 33.3 g of ultrapure water was added and stirred with a hot stirrer (revolution per minute: 500 rpm) until the above-mentioned compounds dissolved in the ultrapure water. To the mixed solution, 0.5 g of PEG (molecular weight: 20000, commercially available from Wako Pure Chemical Industries, Ltd.) was added and again stirred with the hot stirrer at 500 rpm. The resulting raw material solution was transferred into an alumina crucible, which was then placed in a heating furnace. The temperature within the furnace was raised at the rate of 10° C./min. in a nitrogen gas stream until the temperature reached 400° C. Then, the mixture contained in the crucible was subjected to heating treatment at 400° C. for 10 minutes. The resulting powder was disintegrated and mixed in a mortar and again transferred into a crucible, which was then placed in a heating furnace. The temperature within a furnace was raised at the rate of 10° C./min. in an atmospheric atmosphere until the temperature reached 800° C. Then, the mixture contained in the crucible was fired at 800° C. for 90 minutes. The ultraviolet (350 nm) excitation-emission spectrum of the resulting phosphor is shown in FIG. 7. The fluorescence quantum efficiency was 42%.

TABLE 1

Peak top wavelength and fluorescence quantum efficiency of ultraviolet excitation-emission spectra of phosphors obtained in Examples and Comparative Examples

|  | Peak top wavelength (nm) | Fluorescence quantum efficiency |
|---|---|---|
| Example 1 | 480 | 56% |
| Comparative Example 1 | 480 | 51% |
| Example 2 | 530 | 44% |
| Comparative Example 2 | 506 | 39% |
| Example 3 | 412 | 55% |
| Example 4 | 572 | 53% |
| Example 5 | 480 | 55% |
| Example 6 | 530 | 45% |
| Example 7 | 380 | 42% |

Comparison of the ultraviolet excitation-emission spectra of FIGS. 1 and 2 (corresponding to Example 1 of the present invention and Comparative Example 1, respectively) reveals that the wavelengths of the peak tops of the mountain-shaped ultraviolet excitation-emission spectrum curves are almost the same values, but the curve of the ultraviolet excitation-emission spectrum of Example 1 has a narrower peak width than that of Comparative Example 1. Similarly, comparison of the ultraviolet excitation-emission spectra of FIGS. 3 and 4 (corresponding to Example 2 of the present invention and Comparative Example 2, respectively) reveals that the ultraviolet excitation-emission spectrum curve of Example 2 has a narrower peak width than that of Comparative Example 2 (it should be noted, however, that the wavelength of the peak top of Comparative Example 2 is slightly shifted towards a short-wavelength range, compared with the wavelength of the peak top of Example 2, which corresponds to Comparative Example 2). From the above results of comparison it becomes clear that the phosphors obtained in Examples 1 and 2 exhibited fluorescence emission with high color purity, compared with the phosphors of the corresponding comparative examples.

Next, comparison of FIGS. 1, 3, 5 and 6 (corresponding to Examples 1, 2, 3 and 4 of the present invention, respectively), in which the wavelengths of peak tops of the mountain-shaped ultraviolet excitation-emission spectrum curves in FIGS. 1, 3, 5, and 6 are 480 nm, 530 nm, 412 nm, and 572 nm, respectively, reveals that although the shapes of bottom parts of the peaks of the ultraviolet excitation-emission spectrum curves are slightly different, the shapes of upper parts are narrow to such an extent that the curves can almost be superposed. From the above results of comparison, it is understood that when the firing was performed after the formation and the disintegration of the pyrolysate, the rate of increasing the temperature and the period of time when the firing temperature is maintained have relatively small effect on the shape of the ultraviolet excitation-emission spectrum curves and, hence, an M-C-N-O based phosphor with high uniformity and stable characteristics is easily obtained by the method of the present invention.

Further, from the results of Example 5 and 6, it becomes clear that even when the M-C-N-O based phosphor produced by the method of the present invention is ground by a ball mill, there would be almost no change in its ultraviolet (350 nm) excitation-emission spectrum and fluorescence quantum efficiency. This shows that the M-C-N-O based phosphors produced by the method of the present invention do not have a problem that grinding causes a change in fluorescent color or a decrease in fluorescence intensity by grinding.

Meanwhile, Examples 1 to 6 and Comparative Examples 1 and 2 correspond to production examples of an M-C-N-O based phosphor wherein the group IIIB element (M) is boron. While one clear absorption peak appeared in the wavenumber range of 1200 to 1250 $cm^{-1}$ and in the wavenumber range of 1300 to 1400 $cm^{-1}$ in the infrared absorption spectra of the M-C-N-O based phosphors obtained in Examples 1 to 6, the above characteristic absorption peak did not appear in the comparative examples which do not correspond to the production method of the present invention. Further, it becomes clear that in the case of the phosphors of the present invention, the ratio of the intensity of the absorption peak appeared in the range of 1200 to 1250 $cm^{-1}$ to the intensity of the absorption peak appeared in the range of 1300 to 1400 $cm^{-1}$ is about 0.5 or higher and about 2 or lower. Therefore, when M is boron, formation of the M-C-N-O based phosphor of the present invention can be confirmed by measuring the infrared absorption spectrum of the above wavenumber range.

INDUSTRIAL APPLICABILITY

The production method of the present invention can provide an M-C-N-O based phosphor with high color purity, uniform brightness, and high uniformity and is, thus, industrially advantageous.

The invention claimed is:

1. A method of producing an M-C-N-O phosphor consisting of a group IIIB element (M), carbon (C), nitrogen (N) and oxygen (O), the method comprising:
   heating a mixture comprising a group IIIB element-comprising compound and a nitrogen-comprising organic compound to form a pyrolysate-comprising product;
   disintegrating the pyrolysate-comprising product to form a disintegrated product; and
   firing the disintegrated product in an oxygen-comprising atmosphere.

2. The method of claim 1, wherein the mixture further comprises a dispersing agent.

3. The method of claim 1, wherein the mixture comprising a group IIIB element-comprising compound and a nitrogen-comprising organic compound is heated at a temperature in a range of 150° C. to 600° C.

4. The method of claim 1, wherein the mixture comprising a group IIIB element-comprising compound and a nitrogen-comprising organic compound is heated in an atmosphere of an inert gas.

5. The method of claim 1, wherein a firing temperature is in a range of 500° C. to 1000° C.

6. The method of claim 1, further comprising grinding a phosphor product obtained by the firing.

7. The method of claim 6, wherein the phosphor product is ground into particles having an average particle size of 1 μm or smaller.

8. The method of claim 1, wherein the Group IIIB element (M) is boron (B).

9. The method of claim 1, wherein the Group IIIB element (M) is aluminum (Al).

10. The method of claim 2, wherein the mixture comprising a group IIIB element-comprising compound and a nitrogen-comprising organic compound is heated at a temperature in a range of 150° C. to 600° C.

11. The method of claim 2, wherein the mixture comprising a group IIIB element-comprising compound and a nitrogen-comprising organic compound is heated in an atmosphere of an inert gas.

12. The method of claim 2, wherein a firing temperature is in a range of 500° C. to 1000° C.

13. The method of claim 2, further comprising grinding a phosphor product obtained by the firing.

14. The method of claim 3, wherein the mixture comprising a group IIIB element-comprising compound and a nitrogen-comprising organic compound is heated in an atmosphere of an inert gas.

15. The method of claim 3, wherein a firing temperature is in a range of 500° C. to 1000° C.

16. The method of claim 3, further comprising grinding a phosphor product obtained by the firing.

17. The method of claim 4, wherein a firing temperature is in a range of 500° C. to 1000° C.

18. The method of claim 4, further comprising grinding a phosphor product obtained by the firing.

19. An M-C-N-O phosphor produced by the method of claim 8, wherein a ratio of a peak intensity observed in a range of 1300 to 1400 $cm^{-1}$ to a peak intensity observed in a range of 1200 to 1250 $cm^{-1}$ in an IR spectrum of the M-C-N-O phosphor is 0.5 or higher and 2 or lower.

20. An M-C-N-O phosphor with an average particle size of 1 μm or smaller produced by the method of claim 1.

* * * * *